United States Patent
Shah et al.

(10) Patent No.: US 10,499,233 B2
(45) Date of Patent: Dec. 3, 2019

(54) DYNAMIC VEHICLE DISASTER RELIEF

(71) Applicant: Ford Global Technologies, LLC, Dearborn, MI (US)

(72) Inventors: Ayush Shah, Belleville, MI (US); Oleg Yurievitch Gusikhin, Commerce Township, MI (US); Omar Makke, Lyon Township, MI (US); Sandeep Sasidharan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/971,422

(22) Filed: May 4, 2018

(65) Prior Publication Data

US 2019/0342739 A1 Nov. 7, 2019

(51) Int. Cl.
| | |
|---|---|
| G08G 1/00 | (2006.01) |
| H04W 4/90 | (2018.01) |
| H04W 4/021 | (2018.01) |
| G01C 21/34 | (2006.01) |
| H04W 4/46 | (2018.01) |
| H04W 4/44 | (2018.01) |

(52) U.S. Cl.
CPC .......... *H04W 4/90* (2018.02); *G01C 21/3461* (2013.01); *H04W 4/021* (2013.01); *H04W 4/44* (2018.02); *H04W 4/46* (2018.02)

(58) Field of Classification Search
None
See application file for complete search history.

(56) References Cited

U.S. PATENT DOCUMENTS

| | | | | |
|---|---|---|---|---|
| 9,817,948 | B2* | 11/2017 | Swank | G06F 19/3418 |
| 2010/0228404 | A1* | 9/2010 | Link, II | G06F 9/44542 |
| | | | | 701/1 |
| 2010/0317317 | A1* | 12/2010 | Maier | H04W 64/00 |
| | | | | 455/404.2 |
| 2013/0018705 | A1* | 1/2013 | Heath | G08G 1/017 |
| | | | | 705/13 |
| 2014/0109080 | A1* | 4/2014 | Ricci | G06F 8/61 |
| | | | | 717/174 |
| 2016/0358432 | A1* | 12/2016 | Branscomb | G08B 13/1965 |
| 2016/0363457 | A1 | 12/2016 | Jelavic et al. | |
| 2017/0099579 | A1* | 4/2017 | Ryan | H04W 4/029 |
| 2018/0121903 | A1* | 5/2018 | Al Salah | G06Q 20/24 |
| 2019/0073896 | A1* | 3/2019 | Pinckney-Maas | G08B 27/006 |

OTHER PUBLICATIONS

Anirban Sen Chowdhary; Nov. 7, 2016, Integration Zone, Dzone, "Dynamic CloudHub Deployment From Mule Application.".

* cited by examiner

*Primary Examiner* — Julie B Lieu
(74) *Attorney, Agent, or Firm* — Jennifer M. Stec; Brooks Kushman P.C.

(57) ABSTRACT

Systems and methods for dynamic vehicle disaster relief include a vehicle that, responsive to entering a geofenced area including a disaster, communicates the vehicle is within the geofenced area to a server. The vehicle installs a user interface received from the server responsive to the communication. The user interface is for a geofenced application associated with the geofenced area and executing on the server. The vehicle then communicates a volunteer commit message from the user interface to the geofenced application on the server.

20 Claims, 5 Drawing Sheets

DYNAMIC VEHICLE DISASTER RELIEF

TECHNICAL FIELD

Aspects of this disclosure generally relate to systems and methods for dynamic vehicle disaster relief.

BACKGROUND OF THE INVENTION

In the chaos ensuing a disaster, providing aid to those affected is increasingly difficult. For example, following a disaster, cellular communications may be limited, electricity may be unavailable, supplies such as food, water, and gasoline are often scarce, and travel infrastructure may be overcrowded or damaged. This turmoil hinders organizing assistance for those affected by the disaster.

SUMMARY OF THE INVENTION

In an exemplary embodiment, a system includes a vehicle configured to, responsive to entering a geofenced area including a disaster, communicate the vehicle is within the geofenced area to a server. The vehicle is further configured to install a user interface received from the server responsive to the communication. The user interface is for a geofenced application associated with the geofenced area and executing on the server. The vehicle is also configured to communicate a volunteer commit message from the user interface to the geofenced application on the server.

In a further exemplary embodiment, a system includes a server for a geofenced area including a disaster. The server is configured to, responsive to a first vehicle entering the geofenced area, transmit a user interface to the first vehicle. The server is further configured to, responsive to receiving sensed environmental data from a second vehicle within the geofenced area that hosts the user interface, generate tasks based on the environmental data. The server is also configured to transmit the tasks to the first and second vehicles for inclusion on the user interface.

In another exemplary embodiment, a method implemented by a server vehicle for a geofenced area including a disaster includes, responsive to entering a first area with access to a cloud server, receiving, from the cloud server, a user interface and task data for the geofenced area. The method further includes, responsive to entering a second area within the geofenced area without access to the cloud server, transmitting the user interface and task data to a volunteer vehicle in the geofenced area.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
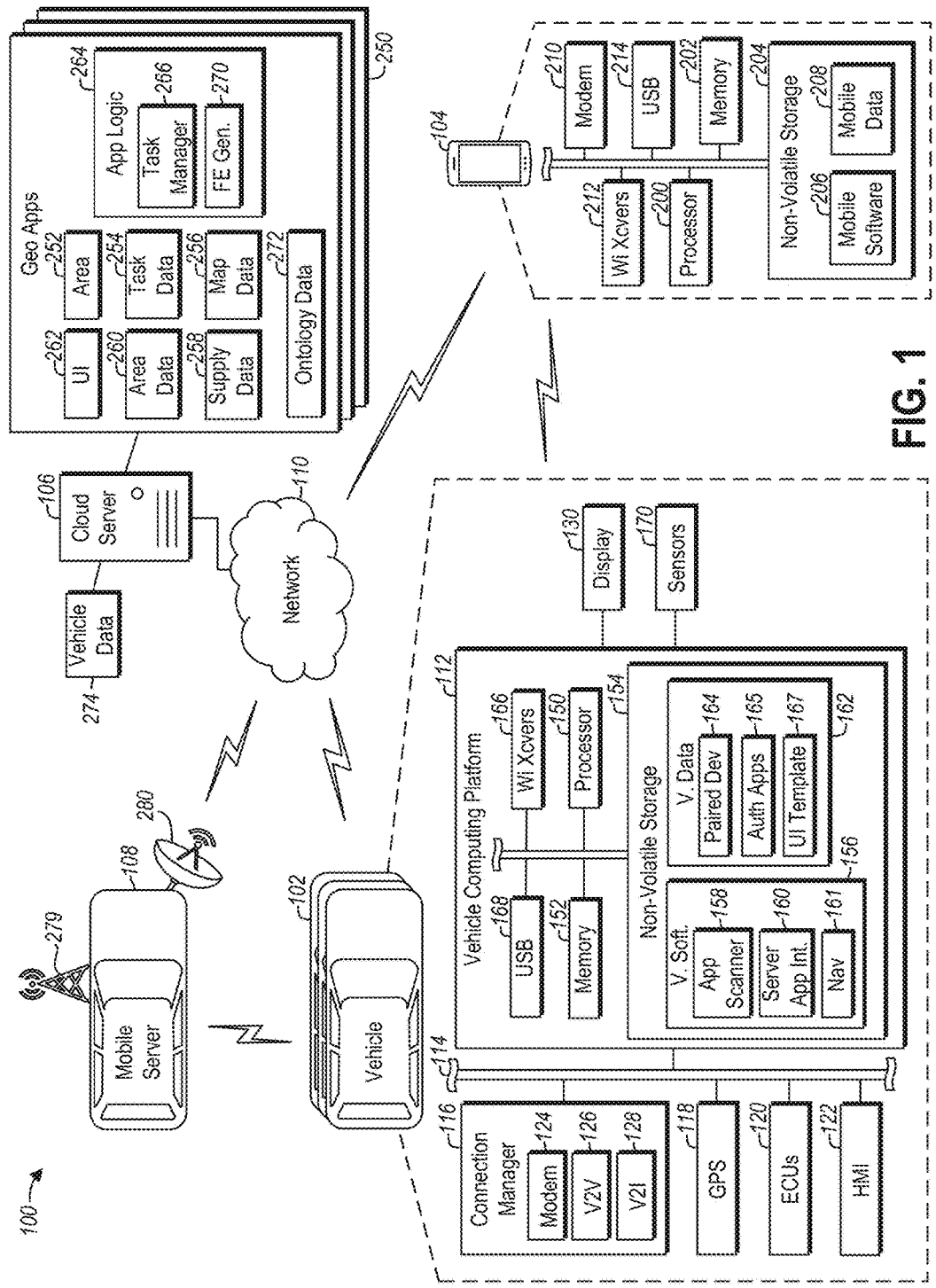
FIG. 1 is a schematic diagram illustrating an exemplary system for providing dynamic disaster relief using vehicle communications.

FIG. 1 illustrates a system 100 for providing disaster relief to a geographic area affected by a disaster. When a disaster occurs in a given geographic area, technology and infrastructure in the geographic area often become limited. For example, roads may be impassable due to broken trees and other fallen debris. Electricity may be unavailable, which may limit or prevent communication by those needing assistance and volunteers in the geographic area. Even if cellular phone communication is available in the geographic area, the networks may be congested, which may limit connectivity and result in the inefficient assignment of volunteer tasks. Moreover, many volunteers utilize their vehicles when offering assistance in the geographic area, and operating a cellular device while driving is dangerous, especially in disaster areas where unpredicted conditions may exist. As a consequence of these chaotic conditions, relief efforts for disaster areas are often inefficient and unorganized.

The system 100 includes a non-conventional arrangement of vehicular technology to solve the deficiencies of conventional disaster relief systems. Specifically, a geofenced application may be deployed to a vehicle-accessible server responsive to or in anticipation of a disaster in a geographical area. The geofenced application may be associated with a geofenced area that includes the geographical area, and may be configured to receive geofenced area data indicating hazardous conditions resulting from the disaster (e.g., infrastructure damage, hazardous environmental conditions, assistance requests) from vehicles in the geofenced area. The geofenced application may be configured to generate tasks for the vehicles in the geofenced area based on the received geofenced area data.

Responsive to a vehicle entering the geofenced area, the vehicle may be configured to automatically download and install a user interface (UI) for the geofenced application executing on the server, and may thereafter show the UI on the vehicle's embedded display. Because the vehicle may be configured to automatically identify and install the geofenced application UI upon entering the geofenced area, the prospective volunteer may not need to search for and download a disaster application, such as via an app store, which alleviates the risk of volunteers unknowingly becoming part of an unauthorized and unsafe disaster relief endeavor or scam, and which further reduces volunteer distraction when driving within or around the geofenced area. The geofenced application executing on the server may be configured to periodically update and transmit tasks to the vehicle-hosted UI, with which a user may interact to view information about available tasks and volunteer.

Although the UI of the geofenced application may be downloaded to the vehicle, the data processing logic of the geofenced application may remain at the server and not be downloaded to the vehicle. In this way, the data processing aspects of the geofenced application may remain at the server and not burden the resources of the vehicle, which may improve the speed at which the vehicle is able to operate the downloaded UI. Furthermore, because a user of the vehicle may view a list of available tasks that is periodically updated by the geofenced application via the vehicle's embedded display, the volunteer is not distracted by attempting multiple calls to a command station via a congested network using a cellular phone. These and other valuable features of the system 100 are discussed in further detail below.

The system 100 may include one or more vehicles 102, a mobile device 104, a cloud server 106, and a mobile server 108. Each of these system 100 components may communicate with one or more of the other components directly and/or over the network 110. The network 110 may include one or more interconnected communication networks, such as one or more of the Internet, a cable television distribution network, a satellite link network, a local area network, a wide area network, and a telephone network.

The vehicles 102 may include various types of automobile, crossover utility vehicle (CUV), sport utility vehicle (SUV), truck, recreational vehicle (RV), boat, plane or other mobile machine for transporting people or goods. In many cases, a vehicle 102 may be powered by an internal combustion engine. As another possibility, a vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). A vehicle 102 may also be an autonomous vehicle (AV). As the type and configuration of the vehicles 102 may vary, the capabilities of the vehicles 102 may correspondingly vary. For example, different vehicles 102 may have different capabilities with respect to passenger capacity, towing ability and capacity, and storage volume. For title, inventory, and other purposes, each vehicle 102 may be associated with and include, such as in non-volatile storage 154 of the vehicle 102, a unique identifier, such as a Vehicle Identification Number ("VIN").

Each vehicle 102 may include a vehicle computing platform 112 configured to perform functions in support of the processes described herein. For example, the vehicle computing platform 112 may be configured to discover geofenced applications 250 executing on the cloud server 106 that correspond to a current location of the vehicle 102, to host a geofenced application UI 262 for each discovered geofenced application 250, and to transmit volunteer commit messages to the cloud server 106 for the geofenced application 250. The vehicle computing platform 112 may communicate with other vehicle 102 components via one or more in-vehicle networks 114. The in-vehicle networks 114 may include one or more of a vehicle controller area network (CAN), an Ethernet network, and a media oriented system transfer (MOST) network. The other vehicle 102 components with which the vehicle computing platform 112 may communicate may include a connection manager 116, a global positioning satellite (GPS) module 118, various vehicle electronic control units (ECUs) 120, and a human machine interface (HMI) 122.

The connection manager 116 may be configured to facilitate wireless communication between the vehicle 102 components and other components of the system 100, either directly or over the network 110. The connection manager 116 may be configured to facilitate wireless communications via radio frequency (RF) transmissions. The other vehicle 102 components may access the communication capabilities of the connection manager 116, and thus communicate with other components of the system 100, over the in-vehicle networks 114.

The connection manager 116 may include a cellular modem 124 or another wireless network transceiver (e.g., Wi-Fi transceiver) configured to connect to the network 110, such as over a cellular network to which the cellular modem 124 is subscribed. The connection manager 116 may also include a vehicle-to-vehicle (V2V) wireless transceiver 126 configured to directly connect with other vehicles, such as the mobile server 108, within communication range of the V2V wireless transceiver 126 via a vehicle-to-vehicle wireless communications protocol. The connection manager 116 may further include a vehicle-to-infrastructure (V2I) wireless transceiver 128 configured to directly connect to substantially fixed travel infrastructure components (e.g., light signals) within wireless communication range of the V2I wireless transceiver 128. Such travel infrastructure components may be capable of receiving and processing data, and may be capable of connecting with and communicating over the network 110. The V2V wireless transceiver 126 and V2I wireless transceiver 128 may each operate under the dedicated short-range communications (DSRC) protocol.

The GPS module 118 of the vehicle 102 may be configured to identify vehicle 102 geographical data, such as via communicating with one or more satellites over a satellite link network. The vehicle 102 geographical data may include a current location (e.g., latitude and longitude coordinates, street address, nearest intersection(s)) and current bearing of the vehicle 102. The GPS module 118 may be configured to provide the vehicle 102 geographical data to the other vehicle 102 components, such as the vehicle computing platform 112, automatically or on request.

The vehicle ECUs 120 may be configured to monitor and manage various functions of the vehicle 102 under the power of the vehicle 102 battery and/or drivetrain. The vehicle ECUs 120 may include, but are not limited to, one or more of a radio transceiver controller configured to manage wireless communications with mobile devices 104 and other local vehicle 102 devices; a powertrain controller configured to monitor and manage engine operating components; a body controller configured to monitor and manage various power control functions such as exterior lighting, interior lighting, keyless entry, remote start, and point of access status verification; and a climate management controller configured to monitor and manage heating and cooling system components (e.g., compressor clutch, blower fan, temperature sensors).

The HMI 122 may facilitate user interaction with the other vehicle 102 components, such as the vehicle ECUs 120 and the vehicle computing platform 112. The HMI 122 may include one or more video and alphanumeric displays, a speaker system, and any other suitable audio and visual indicators capable of providing data from the other vehicle 102 components to the user. The HMI 122 may also include a microphone, physical controls, and any other suitable devices capable for receiving input from a user to invoke functions of the other vehicle 102 components. The physical controls may include an alphanumeric keyboard, a pointing device (e.g., mouse), keypads, pushbuttons, and control knobs. As an example, the physical controls may include steering wheel audio buttons, a push-to-talk button, instrument panel controls, and the like. A display of the HMI 122 may also include a touch screen mechanism for receiving user input.

The vehicle computing platform 112 may be configured to provide entertainment and informational services to a user, such as via a GUI shown on a display 130 embedded in the vehicle 102 and driven by the vehicle computing platform 112. For example, the vehicle computing platform 112 may be configured to provide in-vehicle services such as navigation, radio, playing music from a connected mobile device 104, hands free mobile device 104 calling, voice command recognition, and interacting with remote applications executing on the mobile device 104, the cloud server 106, or the mobile server 108. The vehicle computing platform 112 may also be configured to provide operational information from the other vehicle 102 components, such as the vehicle ECUs 120, via the display 130 or the HMI 122. Moreover, the vehicle computing platform 112 may be configured to receive and process user input submitted to operate the vehicle 102 components, including the vehicle computing platform 112, from the HMI 122 or from the display 130, which may include a touch screen mechanism for receiving user input.

The vehicle computing platform 112 may include a processor 150, memory 152, and non-volatile storage 154. The processor 150 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 152. The memory 152 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 154 may include one or more persistent data storage devices such as a hard drive, optical drive, tape drive, non-volatile solid state device, or any other device capable of persistently storing information.

The processor 150 may be configured to read into memory 152 and execute computer-executable instructions embodied as vehicle software 156 residing in the non-volatile storage 154. This vehicle software 156 may include an operating system and applications, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The vehicle software 156, upon execution by the processor 150, may be configured to cause the vehicle computing platform 112 to implement the functions, features, and processes of the vehicle computing platform 112 described herein. For example, the vehicle software 156 may include a navigation application 161 configured to implement an embedded navigation system of the vehicle 102. The navigation application 161 may be configured to cause the vehicle computing platform 112 to show an interactive navigation UI on the display 130. The navigation application 161 UI may illustrate a map showing the vehicle's 102 current location and bearing based on geographical data from the GPS module 118, and showing current travel conditions such as slow or stopped traffic on the map based on traffic data received via the connection manager 116. The navigation application 161 may also be configured to identify and provide route guidance on the display 130 based on a destination received from a user.

As further examples, the vehicle software 156 may include an application scanner 158 and may include a server application interface 160. The application scanner 158 may be configured upon execution to discover geofenced applications 250 stored on the cloud server 106, such as by transmitting a current location of the vehicle 102 to the cloud server 106, to initiate a session with each discovered geofenced application 250 on the cloud server 106, and to download a geofenced application UI 262 for each discovered geofenced application 250. The server application interface 160 may be configured to verify and execute instructions received from a connected geofenced application 250, and to pass user input received by a hosted geofenced application UI 262 to an associated geofenced application 250 executing on the cloud server 106.

The non-volatile storage 154 of the vehicle computing platform 112 may also include vehicle data 162. The vehicle computing platform 112, or more particularly the vehicle software 156, may access the vehicle data 162 to provide the functions and features of the vehicle computing platform 112 described herein. For example, when receiving a request from a mobile device 104 to establish a wireless connection with the vehicle computing platform 112, the vehicle software 156 may be configured to query paired device data 164 of the vehicle data 162 to determine whether the connection is permitted. If so, then the vehicle software 156 may permit the connection. The vehicle data 162 may also include authorized application data 165 indicating remote applications, such as geofenced applications 250 executing on the cloud server 106, that are authorized to access the vehicle computing platform 112, such as to control aspects of a geofenced application UI 262 hosted by the vehicle 102, and to receive user input submitted to a geofenced application UI 262 hosted by the vehicle 102. The vehicle data 162 may further include one or more UI templates 167, each of which may include a UI design optimized for the vehicle 102. Responsive to receiving a geofenced application UI 262, the vehicle software 156 may be configured to apply the received geofenced application UI 262 to one of the UI templates 167 to ensure the geofenced application UI 262 is displayed in accordance with the limitations of and anti-distraction recommendations for the embedded display 130 of the vehicle 102.

The non-volatile storage 154 may include one or more databases for collecting and organizing the vehicle data 162 stored therein. A database management system in the form of computer software executing as instructions on the processor 150 may be used to access the information or stored data records of the databases in response to a query, which may be dynamically determined and executed by the vehicle software 156.

The vehicle computing platform 112 may also include one or more wireless transceivers 166 and a USB subsystem 168 configured to facilitate direct communication with other components of the system 100, such as when these other components are local to (e.g., within direct wireless or wired communication range of) the vehicle 102. For example, the mobile device 104 may include a personal computing device such as a mobile phone, tablet, or laptop. Similar to the vehicle 102, the mobile device 104 may include a processor 200, memory 202, non-volatile storage 204 including executable mobile software 206 and mobile data 208, a cellular modem 210, one or more wireless transceivers 212, and a USB subsystem 214. The wireless transceivers 212 and the USB subsystem 214 of the mobile device 104 may correspond to the wireless transceivers 166 and the USB subsystem 168 of the vehicle 102, respectively, and may thus be configured to enable direct communication between the vehicle 102 and the mobile device 104. Such communication may enable the vehicle computing platform 112 to provide functions and features reliant on communications with the mobile device 104, such as playing music from the mobile device 104 and hands free mobile device 104 calling.

The wireless transceivers 166 of the vehicle 102 and the wireless transceivers 212 of the mobile device 104 may be configured to communicate via RF transmissions. Each of the wireless transceivers 166 and the wireless transceivers 212 may include, without limitation, a Bluetooth transceiver, a ZigBee transceiver, a Wi-Fi transceiver, a radio-frequency identification ("RFID") transceiver, a near-field communication ("NFC") transceiver, and/or a transceiver designed for another RF protocol particular to a remote service provided by the vehicle 102 (e.g., keyless entry, remote start, passive entry passive start).

Rather than or in addition to communicating over the network 110 via the connection manager 116, the vehicle 102 components may be configured to communicate over the network 110 through a local connection formed between the vehicle 102 and the mobile device 104 (e.g., via the wireless transceivers 166, 212 or via the USB subsystems 168, 214), and an Internet connection of the mobile device 104 formed via the cellular modem 210 of the mobile device 104.

The vehicle 102 may also include electronic sensors 170. The sensors 170 may be arranged around the vehicle 102 and may be configured to sense and generate data indicative of the environment of the vehicle 102. For example, the sensors 170 may include one or more of a hygrometer for measuring humidity outside the vehicle 102, a thermometer for measuring temperature outside the vehicle 102, an anemometer for measuring wind speed outside the vehicle 102, an air quality monitor for measuring the concentration of dust outside the vehicle 102, a camera for capturing images of areas outside the vehicle 102, a pressure gauge to measure air pressure outside the vehicle 102, a rain sensor for detecting rain outside the vehicle 102, a water sensor to detect water floods under the vehicle 102, and a fuel gauge to measure remaining fuel of the vehicle 102. Each of the sensors 170 may be operatively coupled to the vehicle computing platform 112, which may be configured, via the vehicle software 156, to operate and collect environmental data from the sensors 170. The vehicle computing platform 112 may be configured to communicate the collected environmental data over the network 110 to the cloud server 106, which may be configured to dynamically update the geofenced applications 250 based thereon.

As shown in the illustrated embodiment, the sensors 170 may be directly connected to the vehicle computing platform 112. In alternative embodiments, one or more of the sensors 170 may be connected to the vehicle ECUs 120, and the vehicle computing platform 112 may receive data generated by these sensors 170 over the in-vehicle networks 114. Additionally, or alternatively, one or more of the sensors 170, such as the camera, may be part of the mobile device 104, and the vehicle computing platform 112 may receive an image of the vehicle 102 environment generated by the mobile device 104 via a local connection formed between the vehicle computing platform 112 and the mobile device 104.

Similar to the vehicle computing platform 112, each of the other vehicle 102 components, the cloud server 106, and the mobile server 108 may be implemented by at least one processor, memory, and non-volatile storage for storing computing executable instructions and data for the vehicle 102 component, cloud server 106, or mobile server 108. The processor may be configured to read into memory and execute the computer executable instructions, which may be configured, upon execution, to cause the vehicle 102 component, the cloud server 106, or the mobile server 108 to implement the functions described herein.

For example, the cloud server 106 may be configured to execute one or more geofenced applications 250 stored in its non-volatile storage and read into memory by a processor of the cloud server 106. Specifically, each geofenced application 250 may include executable software that, upon execution by a processor of the cloud server 106, causes the cloud server 106 to implement application logic 264 of the geofenced application 250. The non-volatile storage of the cloud server 106 may also include data generated and/or utilized by each executed geofenced application 250, such as a geofenced area 252, task data 254, map data 256, supply data 258, geofenced area data 260, a geofenced application UI 262, ontology data 272, and vehicle data 274.

Each geofenced application 250 executing on the cloud server 106 may be written in a similar language, such as JavaScript, and each may be configured to support one or more emergency services for a particular geofenced area 252. The geofenced area 252 may include a disaster area suffering damages as the result of a natural disaster, such as a hurricane, tornado, fire, earthquake, epidemic, or as the result of an attack.

Each geofenced application 250 associated with a geofenced area 252 may be configured to assist drivers in the geofenced area 252, such as by organizing ad hoc volunteer networks and guiding drivers out of the geofenced area 252. For example, one or more geofenced applications 250 for a given geofenced area 252 may be configured to generate task data 254, map data 256, and supply data 258 for the geofenced area 252. The task data 254 may indicate one or more tasks for which vehicles 102 in the geofenced area 252 may volunteer, and may be transmitted to the vehicles 102 for vehicle 102 occupants to view and volunteer. The map data 256 may indicate available travel infrastructure for the geofenced area 252 and the conditions of such travel infrastructure, and may be transmitted to the vehicles 102 to help guide vehicle 102 occupants through and out of the geofenced area 252. The supply data 258 may indicate the availability of supplies in the geofenced area 252, and may be transmitted to the vehicles 102 to assist vehicle 102 occupants in locating supplies. Each of the task data 254, map data 256, and supply data 258 may be generated based on geofenced area data 260, which may include sensed environmental data, received from the vehicles 102 within the geofenced area 252.

Each geofenced application 250 may be deployed to the cloud server 106 responsive to or in anticipation of a disaster in a given geographic area. Responsive to receiving a new geofenced application 250, the cloud server 106 may be configured to generate a geofenced application UI 262 for the geofenced application 250 through auto-coding. The geofenced application UI 262 may be compatible with the vehicles 102 such that each vehicle 102 is able to show the geofenced application UI 262 on the embedded display 130 and to accept user input for the geofenced application UI 262 via the display 130 or the HMI 122.

Prior to entering the geofenced area 252 associated with a given geofenced application 250, the vehicle 102 may not yet host the geofenced application UI 262 for the given geofenced application 250. Responsive to entering the geofenced area 252 associated with the given geofenced application 250, the vehicle 102 may be configured to automatically download and host the geofenced application UI 262 for the given geofenced application 250, such as in the non-volatile storage 154 and/or the memory 152 of the vehicle computing platform 112, for illustration on the display 130.

Each geofenced application 250 may include application logic 264 that remains on the cloud server 106 and is not transmitted to the vehicle 102, which minimizes the vehicle 102 processing and storage resources utilized by the geofenced application 250. The application logic 264 of a given geofenced application 250 may represent the "brains" of the geofenced application 250, and may correspondingly be configured to process geofenced area data 260 received from the vehicles 102 and other sources (e.g., Internet sources), such as by applying one or more preprogrammed rules to the geofenced area data 260, to produce data for the vehicles 102. This vehicle data generally includes content that may be shown or represented to a user via the display 130 driven by the vehicle computing platform 112 of each vehicle 102, such as via the geofenced application UI 262 hosted by each vehicle 102. The vehicle data produced by the application logic 264 may include, without limitation, the task data 254, the map data 256, and the supply data 258.

For example, the application logic 264 of a given geofenced application 250 may include a task manager 266 that is configured to generate task data 254 indicating one or more volunteer tasks available for the vehicles 102 within the geofenced area 252 based on problems identified from geofenced area data 260 received from the vehicles 102, which may include sensed environmental data and equipment data. The task manager 266 may further be configured to optimize the assignment of available tasks to the vehicles 102 such that tasks needing special equipment or skills (e.g., four wheel drive, driver has medical training) are assigned to vehicles 102 rated to handle the task, and/or such that tasks are assigned to vehicles 102 within a threshold distance and/or having enough fuel to complete the tasks.

The application logic 264 may further include a front end generator 270 that is configured to control what is displayed by a vehicle 102 on behalf of the geofenced application 250. For example, the front end generator 270 may be configured to generate a geofenced application UI 262 for the geofenced application 250. The geofenced application UI 262 generated by the front end generator 270 may include logic defining selectable UI navigation options and screen sequences to be displayed by the vehicle 102, and may define content, such as task data 254, to be shown by the vehicle 102. As new data, such as additional task data 254, is generated by the geofenced application 250, the front end generator 270 may be configured to generate updates to the geofenced application UI 262, which may be transmitted to the vehicle 102 for execution. The application logic 264 may also be configured to process requests received from the vehicles 102, such as supply requests and evacuation route requests, and the front end generator 270 may be configured to generate UI updates that cause the vehicles 102 to display the results of such requests.

Each geofenced application 250 may further include ontology data 272. In general, the ontology data 272 may define a model of the geofenced area 252 that enables the application logic 264, or more particularly the task manager 266, to identify and classify incidences within the geofenced area 252, and to generate task data 254 based thereon. The ontology data 272 may thus define the rules that enable the task manager 266 to generate the task data 254. In other words, the manner in which task manager 266 is configured to generate tasks based on received geofenced area data 260 may be defined by the ontology data 272.

The ontology data 272 may be structured as a hierarchal index in which general concepts handled by the geofenced application 250 are categorized and then further defined by their potential attributes. For each concept listed in the index, the index may include attributes for the concept, and may also include subconcepts. Each subconcept may likewise include attributes and subconcepts, and so on. A concept or subconcept listed in the index may represent a hazardous or problematic incident that may occur in the geofenced area 252, such as "accident" or "infrastructure damage." The attributes of a concept or subconcept may each be associated with one or more potential values that further describe the incident, and which may be identified from received geofenced area data 260. Each potential attribute value or each combination of potential attribute values may point within the index to a solution in the ontology data 272, which may serve as the basis for creating a task.

For instance, the ontology data 272 may define a concept titled "situation," under which may be a subconcept titled "emergency," under which may be a subconcept titled "accident." The attributes for "accident" may include "accident type," "damage," "date," "location," "time," and "victims." If received geofenced area data 260 indicates a vehicle at a given location (e.g., location attribute) with two passengers (e.g., victims attribute) needs to be jump started (e.g., accident type and damage attributes), the task manager 266 may be configured to query the ontology data 272 to categorize the incident as a situation-emergency-accident. The task manager 266 may further be configured to identify that the attribute values indicated in the received geofenced area data 260 for the "accident" subconcept are associated within the ontology data 272 with a solution of providing a vehicle 102 that is within a predetermined distance of the location of the vehicle needing to be jump started, has at least a minimum amount of fuel, and includes a jumper cable and space for two extra passengers in case the vehicle cannot be jump started. The task manager 266 may then be configured to generate a new task for the vehicles 102 based on this data.

One geofenced application 250 may be deployed for each geofenced area 252, where the one geofenced application 250 is configured to facilitate all disaster functions offered for the geofenced area 252. Alternatively, a plurality of geofenced applications 250 may be deployed for each geofenced area 252, where each geofenced application 250 is configured to facilitate a different one or more disaster functions for the geofenced area 252.

The cloud server 106 may also maintain vehicle data 274. The vehicle data 274 may be global to multiple geofenced applications 250 executing on the cloud server 106. Alternatively, the cloud server 106 may maintain different vehicle data 274 for each executing geofenced application 250. The vehicle data 274 may include information about each of the vehicles 102 or volunteers within the geofenced area 252, such as the capabilities, equipment, last recorded location, and volunteer rating of each vehicle 102 or volunteer. The application logic 264 of a geofenced application 250, such as the task manager 266, may utilize this information to optimize task assignments. The information for a given vehicle 102 or volunteer within the vehicle data 274 may be associated within the vehicle data 274 with a vehicle 102 or volunteer identifier, such as the VIN of the vehicle 102.

In some situations, the vehicles 102 and/or the mobile device 104 may be unable to access the network 110 and cloud server 106 in all or part of a given geofenced area 252. This situation may occur, for example, when a disaster has affected cellular communications in the geofenced area 252. In this scenario, a mobile server 108 may be deployed.

The mobile server 108 may be a vehicle similar to a vehicle 102, and may correspondingly include the same or similar components as the vehicles 102. The mobile server 108, which may be referred to as a server vehicle, may be configured to, when the mobile server 108 is in an area with adequate access to the network 110, download and host geofenced applications 250 for a given geofenced area 252, including corresponding data for the geofenced applications 250 (e.g., geofenced area 252, task data 254, map data 256, supply data 258, geofenced area data 260, geofenced application UI 262, ontology data 272) and/or the application logic 264 of the geofenced applications 250. Thereafter, the mobile server 108 may proceed to a part of the geofenced area 252 where access to the network 110 is limited or unavailable. In this position, vehicles 102, which may be referred to as volunteer vehicles, within wireless communication range of the mobile server 108 may form a connection with the mobile server 108. For example, each vehicle 102 having a V2V wireless transceiver 126 in range of the V2V wireless transceiver of the mobile server 108 may connect to the mobile server 108 via its V2V wireless transceiver 126. Alternatively, the mobile server 108 may be equipped with a cellular antenna 279 that enables connection to the mobile server 108 by the cellular modem 124 of each in-range vehicle 102. The mobile server 108 may then be configured to perform functions that would otherwise be performed by the cloud server 106.

For example, and without limitation, the mobile server 108 may be configured to identify vehicles 102 within the geofenced area 252, transmit the geofenced application UI 262 of each hosted geofenced application 250 to the identified vehicles 102, and transmit vehicle data produced by the application logic 264 to the vehicles 102 for display or representation by each geofenced application UI 262 hosted by the vehicles 102. The mobile server 108 may also be configured to receive geofenced area data 260, volunteer commit messages, and assistance requests from the connected vehicles 102, and may be configured to generate and communicate data to the vehicles 102 by applying downloaded application logic 264 to these received items. For example, the mobile server 108 may be configured, such as via hosted application logic 264, to generate new tasks for a vehicle 102 based on received geofenced area data 260, and to make a task unavailable for the vehicles 102 responsive to one or more of the vehicles 102 volunteering for the task.

Periodically, such as every couple of days, the mobile server 108 may return to an area with adequate access to the network 110 to transmit data indicating task statuses (e.g., which tasks have received volunteers or have been completed) and received geofenced area data 260 to the cloud server 106. During this time, the mobile server 108 may receive new or updated geofenced applications 250 for the geofenced area 252 from the cloud server 106. The mobile server 108 may also receive new vehicle data, such as new task data 254, map data 256, and supply data 258, generated by application logic 264 executing on the cloud server 106. For example, responsive to receiving geofenced area data 260 from the mobile server 108, application logic 264 executing on the cloud server 106 may be configured to generate updated task data 254 indicating one or more new tasks for the vehicles 102 based on the received geofenced area data 260. Hence, much of the computational logic of the geofenced applications 250 may remain on the cloud server 106. The mobile server 108 may then return to the position with limited or no network 110 connectivity for distribution of the new or updated geofenced applications 250 and new vehicle data to nearby vehicles 102 (e.g., vehicles 102 in communication range of the mobile server 108 via the V2V wireless transceiver 126).

In some embodiments, the mobile server 108 may be equipped with a satellite 280 that enables the components of the mobile server 108 to access the network 110 via a satellite Internet service to which the satellite 280 is subscribed. In this case, the mobile server 108 may communicate with the cloud server 106 in areas where cellular access to the network 110 is poor or non-existent, and may thus not need to periodically move to a different area every couple of days to communicate with the cloud server 106.

While an exemplary system 100 is shown in FIG. 1, the example is not intended to be limiting. Indeed, the system 100 may have more or fewer components, and alternative components and/or implementations may be used. For instance, vehicle 102 components may be combined such that a given vehicle 102 component is configured to implement at least some the described functions of another vehicle 102 component. As a non-limiting example, at least part of the application scanner 158 and/or the server application interface 160 may be implemented by the connection manager 116 or the vehicle ECUs 120. The vehicle 102 may also include another component in addition to the vehicle 102 components illustrated in FIG. 1 that is separately connected to the in-vehicle networks 114 and is configured to implement at least some of the described functions of another vehicle 102 component. For instance, the vehicle 102 may include another component configured to implement the application scanner 158 and/or server application interface 160.

Figure 2:
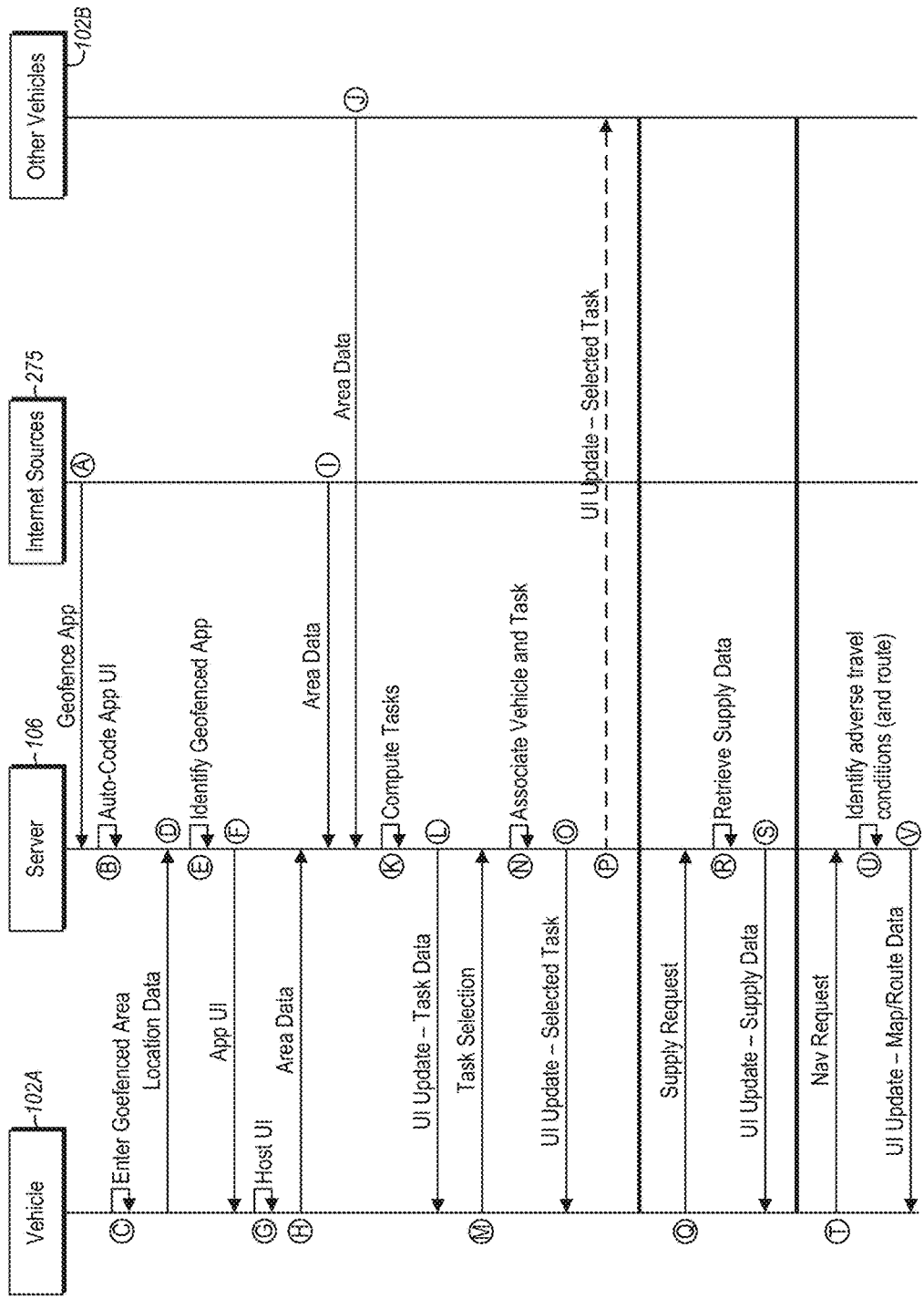
FIG. 2 is a lane diagram illustrating exemplary processes that may be performed by the system of FIG. 1.

FIG. 2 illustrates several processes and communications that may be performed by the system 100 to create and manage an ad hoc assistance network for a geofenced area 252. At A, the cloud server 106 may receive a geofenced application 250 for a geofenced area 252. The geofenced application 250 may be deployed from another Internet source 275 in anticipation of a disaster occurring in the geofenced area 252, and may be written in JavaScript. The Internet source 275 may be a computer system or server managed by a government agency responsible for the geofenced area 252. Although a single geofenced application 250 is often referred to in the illustrated embodiments below, it will be understood that multiple geofenced applications 250 may be deployed for the geofenced area 252, each geofenced application 250 being configured to serve a different assistance function described below.

At B, the cloud server 106 may auto-code a geofenced application UI 262 for the geofenced application 250. In particular, the front end generator 270 for the geofenced application 250, which may be specific to the geofenced application 250 or may be global to multiple geofenced applications 250 executing on the cloud server 106, may be configured to generate computer-executable instructions for implementing the geofenced application UI 262. The instructions may indicate data, such as the task data 254, map data 256, and supply data 258, to be displayed by a vehicle 102 hosting the geofenced application UI 262 at a given time. The generated instructions may also indicate UI logic defining how the geofenced application UI 262 operates responsive to user input. For example, the UI logic may define user-selectable options to be shown by the geofenced application UI 262 (e.g., the selectable options depicted in FIG. 3), and may define display changes and actions for the geofenced application UI 262 responsive to a user selection of one of the options (e.g., selection of a particular option depicted in FIG. 3 causes the screen of FIG. 4 to be illustrated). The instructions generated by the front end generator 270 may be compatible with each of the vehicles 102 such that each vehicle 102 is able to show the geofenced application UI 262 on the embedded display 130 in accordance with the data and UI logic of the geofenced application UI 262, and may be compatible such that no additional plugins need to be downloaded to the vehicle 102 to compile, render, and illustrate the geofenced application UI 262.

The instructions of the geofenced application UI 262 may also indicate a UI template 167 stored on a vehicle 102, which may include a predefined UI design for the vehicle 102, such as colors, font size, button locations, list menus, and so on. The predefined UI design for a vehicle 102 may be compatible with the embedded display 130 of the vehicle 102, and may be configured to meet regulations and recommendations for reducing driver distraction. Responsive to receiving the geofenced application UI 262, the server application interface 160 of the vehicle 102 may be configured to apply the included instructions to the indicated UI template 167 to display the geofenced application UI 262 in accordance with the UI template 167. In this way, the geofenced application 250 connected with the geofenced application UI 262 does not need to be concerned with designing different UI elements and arrangements to ensure that the UI logic and data of the geofenced application UI 262 is optimally and safely shown by each of the vehicles 102, which may have displays 130 of different types, sizes and resolutions, and which may each have a UI template 167 specific to the display 130 of the vehicle 102.

At C, a vehicle 102A, which may be one of the vehicles 102 shown in the system 100, may enter (or come within a predetermined distance of) the geofenced area 252. Responsively, at D, the vehicle 102A may communicate a location message to the cloud server 106 indicating that the vehicle 102A is within (or within a predetermined distance of) the geofenced area 252. Specifically, the application scanner 158 of the vehicle 102A may be configured to periodically communicate location messages to the cloud server 106 over the network 110 while the vehicle 102A is running. Each location message may include current geographic data generated by the GPS module 118 of the vehicle 102A, a current internet protocol ("IP") address of the vehicle 102 relative to the network 110, and an identifier for the vehicle 102A, such as the VIN of the vehicle 102. Responsive to receiving each location message, the cloud server 106 may be configured to determine whether the vehicle 102 is located within (or within a predetermined distance of) the geofenced area 252 associated with the geofenced application 250 hosted by the cloud server 106 based on the data included in the location message.

At E, responsive to receiving a location message indicative that the vehicle 102A is now located within (or within a predetermined distance of) the geofenced area 252, the cloud server 106 may be configured to identify that the geofenced application 250 received at A is available for the vehicle 102A. In some embodiments, this identification may also be based on the VIN for the vehicle 102A included in the location message. For instance, responsive to receiving the VIN of the vehicle 102A, the cloud server 106 may query the vehicle data 274 to determine whether the vehicle 102 is capable of supporting the geofenced application 250. As an example, a vehicle may need to have at least one or more of the sensors 170 and/or an embedded display 130 to support the functionality of the geofenced application 250. The vehicle data 274, which may be accessed by the cloud server 106 responsive to receiving the location message, may indicate these features in association with the VIN from the vehicle 102A.

At F, responsive to identifying the geofenced application 250 received at A, the cloud server 106 may be configured to transmit the geofenced application UI 262 generated for the geofenced application 250 to the vehicle 102A via the network 110. In particular, the cloud server 106 may transmit a message to the vehicle 102A indicating that the geofenced application 250 is available. Responsive to receiving this communication, the application scanner 158 may be configured authorize the geofenced application 250 to transmit instructions to and receive user input the vehicle 102A, such as by adding a corresponding indication in the authorized application data 165 of the vehicle computing platform 112. Thereafter, the server application interface 160 may be configured to initiate a session with the geofenced application 250 executing on the cloud server 106. Upon recognizing the connection with the vehicle 102A via the session, the geofenced application 250 may be configured to transmit the geofenced application UI 262 to the vehicle 102.

At G, the vehicle 102A may install the geofenced application UI 262 transmitted from the cloud server 106. Specifically, the server application interface 160 may be configured to cause the vehicle computing platform 112 to install and show the geofenced application UI 262 on the display 130. The installation may entail applying the geofenced application UI 262 received from the cloud server 106 to a UI template 167 that is stored within the vehicle 102A and possibly indicated in the received geofenced application UI 262. Upon the geofenced application UI 262 being installed, the vehicle computing platform 112 may be configured to show a user selectable icon indicative of the geofenced application 250 on the display 130, and to show a pop-up alert that the geofenced application 250 is available. Thereafter, responsive to a user selection of the icon, the vehicle computing platform 112 may be configured to show the geofenced application UI 262 on the display 130.

Figure 3:
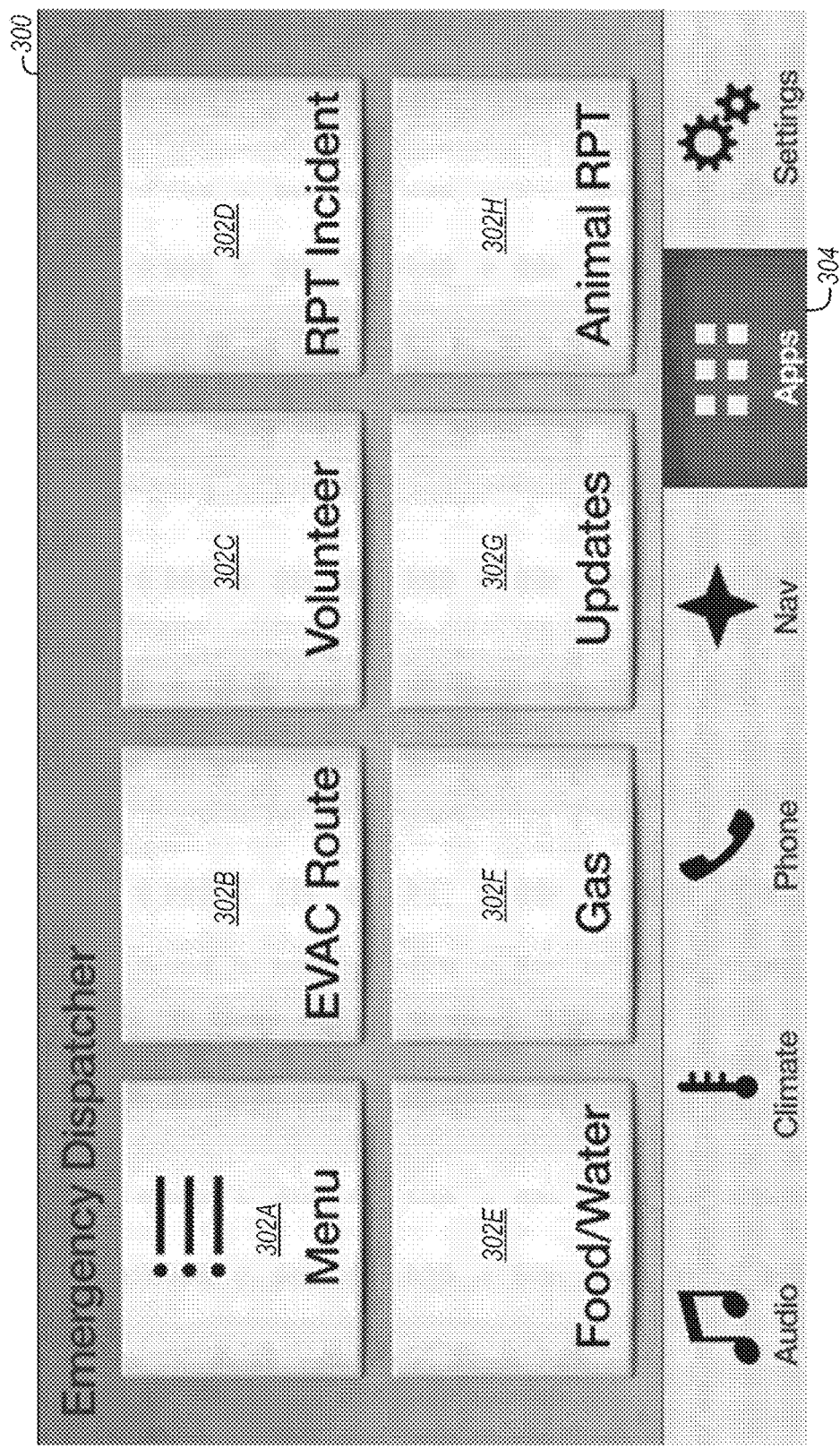
FIG. 3 is a screenshot of an exemplary graphical user interface (GUI) that may be hosted by a vehicle in the system of FIG. 1.

FIG. 3 illustrates a screen 300 that may be shown by the display 130 of the vehicle 102A. Specifically, the screen 300 may be part of a geofenced application UI 262 hosted by the vehicle 102A, and may be shown responsive to a user selecting an apps button 304 on the display 130, and then possibly selecting an icon representative of the geofenced application 250 associated with the geofenced application UI 262. As shown in the illustrated embodiment, the screen 300 may include several selectable icons 302 that each access a different function of the geofenced application 250 associated with the geofenced application UI 262. Such functions may include, without limitation, requesting an evacuation route, viewing available tasks, reporting an incident (e.g., infrastructure damage, injury), requesting or providing supply information (e.g., food, water, gas), requesting updates (e.g., disaster updates), and reporting an animal needing assistance. Responsive to a user selection of one of the icons 302, the geofenced application UI 262 may be configured to show a screen relating to the function associated with the selected icon 302.

The screen 300 and subsequent screens caused by user selection of an icon 302 may be part of a single geofenced application UI 262 associated with a single geofenced application 250 executing on the cloud server 106. In this case, upon receiving user input via the geofenced application UI 262, the server application interface 160 may be configured to transmit and address the user input to the geofenced application 250 executing on the cloud server 106.

Alternatively, the screen 300 may be a general application screen shown on the display 130 by the vehicle software 156 upon selection of the apps button 304, and may illustrate each application (or application UI) hosted by the vehicle 102A. In this case, each icon 302 may represent a different geofenced application 250 executing on the cloud server 106, and each screen shown on the display 130 upon selection of one of the icons 302 may be part of a different geofenced application UI 262 associated with a different geofenced application 250 executing on the cloud server 106. In other words, the cloud server 106 may host several geofenced applications 250, each being configured to implement a different function for the geofenced area 252. Responsive to entering or coming within a predetermined distance of the geofenced area 252, the vehicle 102A may download and host several geofenced application UIs 262 of the several geofenced applications 250, with each geofenced application UI 262 being accessible via a different one of the icons 302. In this case, responsive to receiving user input via a given one of the hosted geofenced application UIs 262, the server application interface 160 may be configured to transmit and specifically address the user input to the geofenced application 250 on the cloud server 106 that is specific to the given geofenced application UI 262.

While the geofenced application UI 262 of the geofenced application 250 may be downloaded to and displayed by the vehicle 102A, other aspects of the geofenced application 250, such as the application logic 264, may remain on the cloud server 106 and not be downloaded to the vehicle 102A. In this way, much of the computational complexity of the geofenced application 250 may remain at the cloud server 106 and not be transferred to the vehicle 102. The geofenced application UI 262 hosted by the vehicle 102A may be operatively coupled with the geofenced application 250 executing on the cloud server 106 via the session established by the server application interface 160. Responsive to generating an instruction for the vehicle 102, such as an instruction for the vehicle 102 to update content shown by a hosted geofenced application UI 262 generated by the front end generator 270, the geofenced application 250 may cause the cloud server 106 to issue a remote procedure call (RPC) for the instruction to the vehicle 102. Responsive to the vehicle 102 receiving the RPC, the server application interface 160 of the vehicle computing platform 112 may be configured to interpret the RPC and cause the vehicle computing platform 112 to execute the instruction.

By retaining much of the computational complexity of the geofenced applications 250 at the cloud server 106, the particular arrangement of components in the system 100 utilize fewer processing and storage resources of the vehicle 102 than if the geofenced applications 250 were fully downloaded and installed on the vehicles 102, enabling the vehicle computing platform 112 to operate geofenced application UIs 262 more efficiently. Moreover, the arrangement of components in the system 100 provides a centralized location (e.g., cloud server 106) in which assistance decisions for the vehicles 102 are based on geofenced area data 260 received from multiple vehicles 102 in a geofenced area 252, resulting in an improved ad hoc disaster assistance network able to make increasingly informed decisions.

At H, the vehicle 102A may transmit geofenced area data 260 to the geofenced application 250 executing on the cloud server 106. The geofenced area data 260 may include environmental data generated by the sensors 170 of the vehicle 102A, and may also include geographical data corresponding to the location in which the environmental data was generated by the sensors 170. For example, the geofenced area data 260 may include the geographical data generated by the GPS module 118. The vehicle computing platform 112 of the vehicle 102A may be configured to automatically transmit sensed environmental data at regular intervals. In some embodiments, the geofenced application UI 262 hosted by the vehicle 102A may include a user-selectable share option for automatically sharing the environmental data with the geofenced application 250 executing on the cloud server 106. In this case, the vehicle computing platform 112 may begin automatically transmitting sensed environmental data generated by the sensors 170 responsive to user selection of the share option via the geofenced application UI 262.

The geofenced area data 260 transmitted from the vehicle 102A may also include incidence reports manually entered and submitted by a user of the vehicle 102A. Specifically, a user may interact with the geofenced application UI 262 hosted by the vehicle 102A to manually report incidents. An incidence report communicated to the geofenced application 250 may include a description of the incident, such as a blocked road, an endangered person, a dangerous animal, and so on. An incident report may also include geographic data indicating a location of the incident. The geographic data may be manually entered by the user, or may be captured from the GPS module 118. An incident report may also include environmental data generated by the sensors 170 of the vehicle 102A at the geographic location. For example, an incident report may include an image captured by a user, such as via the camera sensor 170. For example, a user may interact with the hosted geofenced application UI 262 to direct the vehicle 102A to capture an image via a camera sensor 170 of the vehicle 102A. In addition, or alternatively, the user may capture an image via his or her mobile device 104, and then upload the image to the vehicle computing platform 112 for inclusion in the incident report via a local connection formed between the vehicle computing platform 112 and the mobile device 104.

In some embodiments, the screen 300 may include selectable icons specific to reporting particular incident types. For example, as shown in the illustrated embodiment, the screen 300 may include a selectable icon 302H for reporting animal-related incidents and a different selectable icon 302D for reporting other types of incidents (e.g., infrastructure damage, property damage, endangered person).

The geofenced area data 260 transmitted from the vehicle 102A may further include an identifier for the vehicle 102A, such as the VIN of the vehicle 102A, or an identifier for the user of the vehicle 102A. For example, a user may interact with the geofenced application UI 262, such as via selection of the menu button 302A of the screen 300, to enter his or her personal identifier.

In addition, the geofenced area data 260 transmitted from the vehicle 102A may include an equipment message. The equipment message may indicate available equipment of the vehicle 102A. For example, the equipment message may indicate that the vehicle 102A includes one or more of a towing capability, a chain saw, a water pump, extension cables, ropes, jumper start cables, and supplies such as gasoline, food, or water. A user may enter the available equipment via interaction with the vehicle computing platform 112, such as via the HMI 122 and/or a UI (e.g., the geofenced application UI 262) shown on the display 130. Responsive to receiving the equipment message, the geofenced application 250 may be configured to store indications of the available equipment in the vehicle data 274 in association with the identifier for the vehicle 102A.

In addition to receiving geofenced area data 260 from the vehicle 102A, at I, the cloud server 106 may receive geofenced area data 260 from the Internet sources 275, and at J, the cloud server 106 may receive geofenced area data 260 from other vehicles 102B in the geofenced area 252. The geofenced area data 260 from the Internet sources 275 and from the other vehicles 102B may each include content similar to the content of the geofenced area data 260 from the vehicle 102A. For example, the geofenced area data 260 from the Internet sources 275 and from the vehicles 102B may include sensed environmental data, geographical location data corresponding to the sensed environmental data, and manually entered incident reports, identifiers, and equipment messages. The Internet sources 275 may include Internet-accessible sources of environmental data such as weather conditions for the geofenced area 252, and may include Internet-accessible sources of travel infrastructure data such as roadmaps and traffic and construction conditions for the geofenced area 252.

At K, the geofenced application 250 executing on the cloud server 106 may compute task data 254 indicating one or more tasks for which the vehicle 102A may volunteer. The tasks may include, without limitation, delivering supplies (e.g., gas, water, food, clothing, temporary shelter), clearing a blocked road, jump starting a vehicle, evacuating a trapped person, providing medical services, and detaining a wild animal.

The geofenced application 250, or more particularly the task manager 266 of the geofenced application 250, may be configured to generate the task data 254 based on the received geofenced area data 260. Specifically, the geofenced application 250 may be configured to identify tasks based on assistance needed in the geofenced area 252, which may be identified from the environmental data and the incident reports of the received geofenced area data 260 communicated to the geofenced application 250. For instance, the task manager 266 may be configured to generate a task corresponding to each received incident report. In addition, the task manager 266 may be configured to automatically recognize incidences from sensed environmental data. For example, if an image captured by a vehicle 102 shows debris blocking a road, then the task manager 266 may be configured to digitally process the image to recognize the condition and generate a task of clearing the debris. As a further example, if the sensed environmental data indicates a temperature condition, dust condition, and wind condition typically associated with a fire, then the task manager 266 may be configured to automatically recognize a fire condition at the geographic location corresponding to the sensed environmental data, and generate a task of fighting the fire. As previously discussed, the task manager 266 may identify such problems and solutions from the received geofenced area data 260 by querying the ontology data 272 with the geofenced area data 260. Furthermore, a user having access to the cloud server 106 (i.e., a back end user) may be charged with viewing geofenced area data 260 received by the cloud server 106 and manually creating tasks for the vehicles 102 based thereon.

Each task generated by the task manager 266 may include an incident in the geofenced area 252 needing assistance and may include data associated with the incident (e.g., sensed environmental data from which the incident was identified, image included an incident report). Each task may further include a geographic location for the incident.

In some embodiments, the task manager 266 may be configured to tailor task data 254 for each vehicle 102 based on the geofenced area data 260 received from the respective vehicle 102. In other words, the vehicle 102A may receive tasks that are not received by other vehicles 102B. For instance, the task manager 266 may be configured to determine that a task requires particular equipment, such as a chain saw to clear debris from a road, jumper cables to jump start a vehicle, or a given type of supply (e.g., water, gasoline). As an example, an identified task may relate to one of several available equipment-related types (e.g., fuel supply type, food supply type, water supply type, dead battery type, debris removal type, medical type, animal control type), and the ontology data 272 may include rules associating each of the available equipment-related types with one or more equipment items. Alternatively, a user may manually enter one or more equipment items needed for a task, such as via including such equipment items in a user-submitted incident report.

For tasks that require particular equipment items, the task manager 266 may be configured to only transmit such tasks to vehicles 102 that include the equipment, such as indicated in the vehicle data 274 based on an equipment message received from the vehicle 102. As an example, a task may entail delivering gasoline to a given geographical location along an evacuation route. The task manager 266 may be configured to query the vehicle data 274 and assign this task to a vehicle 102 including a container for hauling gasoline.

As another example, the task manager 266 may be configured to tailor tasks based on priority. In particular, the task manager 266 may be configured to determine that some tasks have a higher priority than other tasks, such as based on a priority-related type associated with each task. For example, tasks classified as being of a medical type, such as in the ontology data 272, may have a higher priority than tasks classified as being of a non-medical type; tasks classified as being of a main road type, such as in the ontology data 272, may have a higher priority than tasks of a side road type; and tasks classified as being of an emergent type (e.g., likely to cause immediate harm or death), such as in the ontology data 272, may have a higher priority than tasks of a non-emergent type. Alternatively, a user may manually enter a priority level for a given task, such as via including such priority level in a user-submitted incident report.

The cloud server 106 may be configured to maintain rating data for each vehicle identifier or personal identifier included in the received geofenced area data 260, such as in the vehicle data 274. For example, upon completion of a task, a user other than the volunteer completing the task (e.g., volunteer organizer, assisted person) may be able to rate the vehicle 102 or volunteer that completed the task, which may be averaged with previous ratings and stored by the cloud server 106 in the vehicle data 274 in connection with the vehicle 102 identifier or volunteer identifier. The task manager 266 may be configured to assign tasks having a priority level higher than a threshold priority to only those vehicles 102 or volunteers with an average rating higher than a threshold rating.

As a further example, the task manager 266 may be configured to tailor tasks for the vehicles 102 based on a last known location of the vehicles 102 and the geographic location of the task. In particular, the task manager 266 may be configured to only share tasks with vehicles 102 within a predetermined distance of the geographic location of the task based on a last known location of the vehicles 102, which may be indicated in the geofenced area data 260 most recently received from each vehicle 102, and may be stored in the vehicle data 274.

Figure 4:
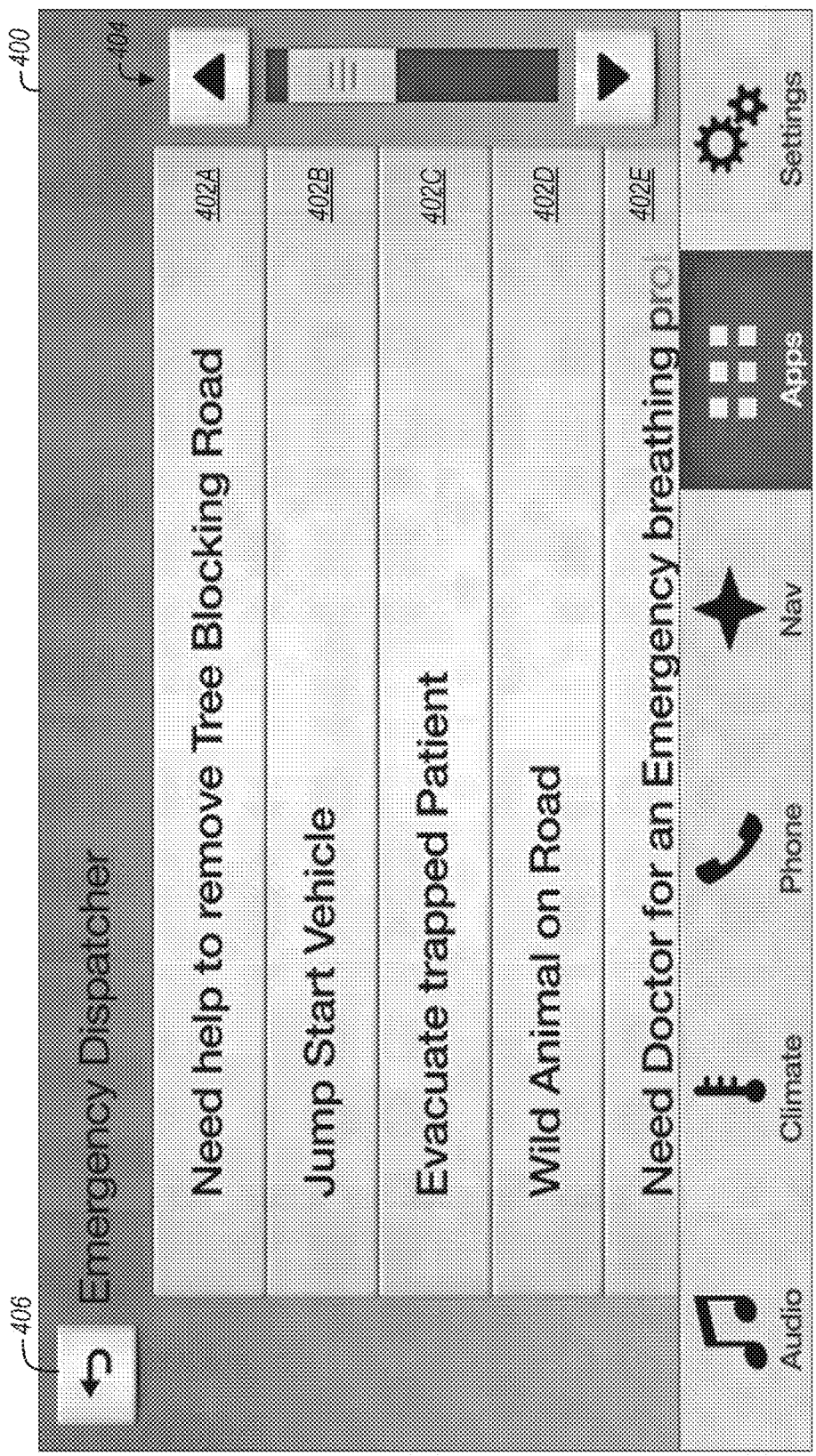
FIG. 4 is another screenshot of the exemplary GUI of FIG. 3.

At L, the cloud server 106, at the direction of the geofenced application 250, may transmit a UI update to the vehicle 102A. The UI update, which may be generated by the front end generator 270, may include the task data 254 generated for the vehicle 102A. Responsive to receiving the UI update, the vehicle computing platform 112 may be configured to update the hosted geofenced application UI 262 to show the one or more tasks of the received task data 254. For example, FIG. 4 illustrates a screen 400 that may be shown by a hosted geofenced application UI 262 after being modified with the task data 254. The screen 400 may be shown by the hosted geofenced application UI 262 responsive to user selecting the icon 302C shown in the screen 300 (FIG. 3). As shown in the illustrated embodiment, the screen 400 may include a list of selectable tasks 402 corresponding to the received task data 254. The screen 400 may also include an interactive scroll element 404 for scrolling the list of tasks 402, and may include an interactive return element 406 for returning to a previous screen shown on the display 130 (e.g., the screen 300).

Figure 5:
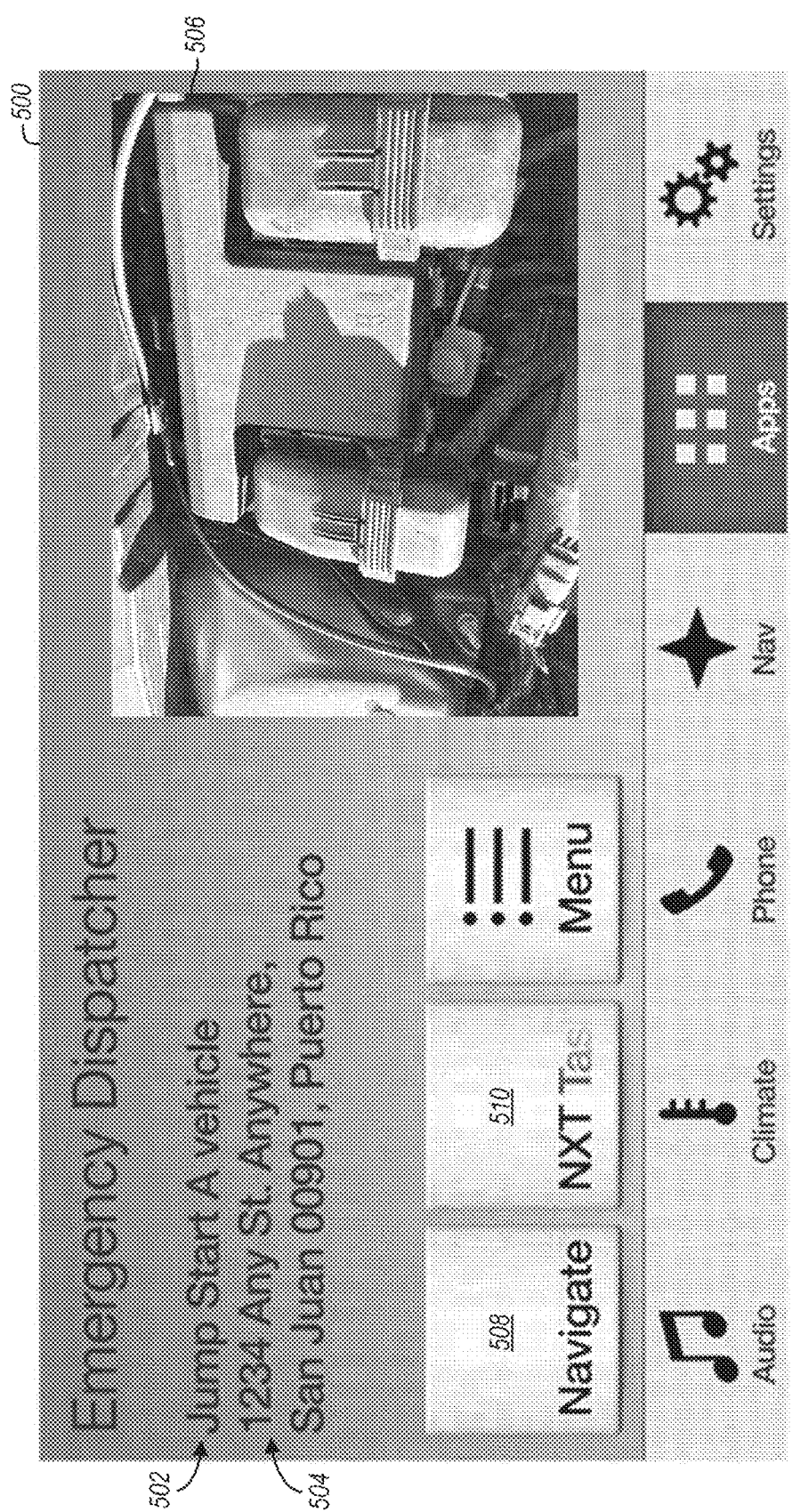
FIG. 5 is a further screenshot of the exemplary GUI of FIG. 3.

Responsive to selection of one of the tasks 402, the hosted geofenced application UI 262 may be configured to show a screen illustrating additional details about the selected task 402. For example, FIG. 5 illustrates a screen 500 that may be shown by the hosted geofenced application UI 262 responsive to selection of the task element 402B on the screen 400. The screen 500 may include one or more of a task description 502, a task location 504, and a task image 506, each of which may have been within the geofenced area data 260 received by the cloud server 106. The screen 500 may also include an interactive accept element 508 that upon user interaction causes the vehicle 102A to volunteer for the displayed task 402. The screen 500 may further include an interactive next element 510 that upon interaction causes the hosted geofenced application UI 262 to show another screen including the details of a next task 402 in the list of tasks 402 from the screen 400, such as in the same or similar format as in the screen 500.

Referring again to FIG. 2, at M, the vehicle computing platform 112 may be configured to transmit a volunteer commit message to the cloud server 106, where the volunteer commit message indicates one of the tasks shown by the hosted geofenced application UI 262 that has been volunteered for by a user of the vehicle 102A via the hosted geofenced application UI 262. Specifically, the server application interface 160 may cause the vehicle computing platform 112 to transmit the volunteer commit message to the geofenced application 250 executing on the cloud server 106. The volunteer commit message may indicate the selected task and an identifier specific to the vehicle 102A.

At N, responsive to the cloud server 106 receiving the volunteer commit message, the geofenced application 250, or more particularly the task manager 266, may be configured to associate the vehicle 102A with the selected task, such as via the identifier included in the volunteer commit message. Thereafter, at O, the front end generator 270 may cause the cloud server 106 to transmit a UI update to the vehicle 102A that causes the vehicle computing platform 112 to remove the selected task as an available option from the geofenced application UI 262, and/or causes the geofenced application UI 262 to illustrate that the vehicle 102A has volunteered for the selected task. Moreover, the UI update may cause the vehicle computing platform 112 to present navigation guidance on the display 130 to the task location associated with the selected task. The navigation guidance may be shown via the geofenced application UI 262 or, alternatively, via the UI of the navigation application 161 installed on the vehicle computing platform 112, which, unlike the geofenced application UI 262, may be available to a user outside (or greater than the predetermined distance from) the geofenced area 252.

Responsive to receiving a volunteer commit message for a given task from the vehicle 102A, the geofenced application 250, or more particularly the task manager 266, may further determine whether the given task is also present on other vehicles 102B. If so, then the task manager 266 may determine whether additional volunteers are needed for the given task. Specifically, each task generated via the task manager 266 may include a volunteer number indicative of the number of volunteers being requested for the task. If the given task is present on one or more of the other vehicles 102B and additional volunteers are not requested for the given task, then at P, the front end generator 270 may communicate a task removal message to the other vehicles 102B that directs the vehicles 102B to remove the selected task from the geofenced application UI 262 hosted on the vehicles 102B. Alternatively, if the given task is present on the other vehicles 102B and additional volunteers are requested for the given task, then the given task may remain on the other vehicles 102B, and the task manager 266 may continue to receive and process volunteer commit messages from the other vehicles 102B until enough vehicles 102 have volunteered for the given task.

At Q, the vehicle 102A may transmit a supply request to the cloud server 106 for the geofenced application 250. Specifically, a user of the vehicle 102A may interact with the vehicle computing platform 112 to cause communication of the supply request (e.g., interacting with selectable icons 302E or 302F of the screen 300 (FIG. 3)). The supply request may include a type of supply, such as gasoline, food, water, or shelter, and may also indicate a current geographical location of the vehicle 102A, which may include the geographical data generated by the GPS module 118.

At R, responsive to the cloud server 106 receiving the supply request, the application logic 264 of the geofenced application 250 may retrieve supply data 258 indicating availability of the supply type indicated in the supply request. Specifically, the application logic 264 may be configured to query a database of the supply data 258. The database of supply data 258 may indicate locations within the geofenced area 252 that either have or are expected to have an upcoming delivery of the type of supply included in the supply request. Such data may be entered manually. In addition, or alternatively, responsive to a vehicle 102 volunteering for or being assigned a task to deliver supplies of a given type to a given location in the geofenced area 252, the application logic 264 may be configured to update the database of supply data 258 to indicate the availability or expected availability of supplies of the given type at the given location.

For each location having or expecting an upcoming delivery of a type of supply, the supply data 258 database may also include periodically updated wait time data indicative of a wait time for an additional vehicle 102 to be able to access the supply at the given location. The wait time for accessing the supply at the given location may be based on the number of other vehicles 102 currently waiting for access to the supply at the given location, which may be determined from the number of supply requests previously received from the vehicles 102 that returned the given location, whether a vehicle 102 occupant has indicated, such as via its hosted geofenced application UI 262, that it is navigating to or intending to access the supply at the given location, and/or based on the number of vehicles 102 or persons reported as currently at the given location waiting for the supply. Moreover, if the supply is not yet delivered to an expected delivery location, the wait time may be based on an expected delivery time. For example, the waiting wait time at a given location may be equal to the number of vehicles 102 or persons reported as currently at the given location, currently navigating to the given location, and/or having indicated an intention to access the supply at the given location times a predetermined access time, plus a time difference between a current time and an expected delivery time of the supply.

The application logic 264 may thus be configured to query the database of supply data 258 based on the supply type and/or geographic location included in the supply request to find locations in the geofenced area 252. Responsive to the query, the application logic 264 may receive supply data 258 indicative of locations within the geofenced area 252 having supplies of the type included in the request or expecting an upcoming delivery of supplies of the type included in the request in the near future (e.g., an upcoming supply delivery expected at a location within a given threshold from the current time). The locations of the returned supply data 258 may be further filtered and/or limited to locations within a predetermined distance of a current position of the vehicle 102A and in a direction corresponding to a current bearing of the vehicle 102A, as indicated in the supply request.

At S, the application logic 264 may cause the cloud server 106 to transmit a UI update to the to the vehicle 102A that includes the supply data 258 identified by the application logic 264 at R. In particular, the front end generator 270 may generate a UI update that indicates one or more locations having or expecting an upcoming delivery of a supply of the type in the supply request, may indicate a wait time for each location, and may exclude supply locations that are a distance from the current location of the vehicle 102A that is greater than a predetermined distance or in a wrong direction. Responsive to receiving the UI update at the vehicle 102A, the server application interface 160 may update the hosted geofenced application UI 262 to show the one or more supply locations and wait times. Alternatively, the server application interface 160 may cause a UI of the navigation application 161 to show the one or more supply locations, such as on an interactive map. The navigation application 161 UI or the geofenced application UI 262 may be configured to enable a user to sort the supply locations by wait time or by distance, and to request navigation guidance to a selected supply location, which may be shown via the navigation application 161 UI.

At T, the vehicle 102A may communicate a navigation request to the cloud server 106. The navigation request may include a destination in the geofenced area 252 to which a user desires to travel, or may include a request for guidance to evacuate the geofenced area 252. The user may submit the request via the geofenced application UI 262 hosted by the vehicle 102A, such as by interacting with the selectable icon 302B on the screen 300 (FIG. 3).

At U, responsive to the cloud server 106 receiving the navigation request, the application logic 264 may retrieve map data 256 relevant to the navigation request. The map data 256 may include a record of the travel infrastructure available in the geofenced area 252, and may include data indicative of the conditions of such travel infrastructure, such as if a given road of the travel infrastructure includes a hazardous travel condition (e.g., flooding, unstable or broken materials, blocked by debris) caused by the disaster.

The application logic 264 may be configured to identify and store the travel infrastructure conditions in the map data 256 based on the received geofenced area data 260, and/or based on what qualifies as a hazardous condition according to the ontology data 272. For example, if sensed environmental data received by the application logic 264 indicates a hazardous travel condition on a road (e.g., flooding, limited visibility, debris, broken materials), the application logic 264 may be configured to identify the hazardous condition, such as via using digital image processing to recognize such conditions, comparing historical images of the travel infrastructure to images included in the sensed environmental data, and comparing measurements included in the sensed environmental data to hazard thresholds. The application logic 264 may also be configured to identify hazardous travel infrastructure conditions from incident reports included in the received geofenced area data 260. Responsive to identifying a hazardous condition from the received geofenced area data 260, the application logic 264 may be configured to record the condition in the map data 256 such that the condition corresponds to the geographic location of the condition included in the geofenced area data 260 (e.g., the geographic location from which the sensed environmental data was captured by a vehicle 102, the geographic location included in an incident report).

Further at U, the application logic 264 may identify one or more proposed routes between the current location of the vehicle 102A and the destination included in the navigation request, or an evacuation route, based on the retrieved map data 256 for the geofenced area 252. The application logic 264 may generate the routes so as to avoid hazardous travel infrastructure conditions indicated in the map data 256.

In some embodiments, the navigation request may also include a vehicle 102A identifier, and the application logic 264 may further identify available routes based on the identifier. Specifically, the vehicle data 274 may associate a given vehicle 102 identifier with the capabilities of the vehicle 102, such as four-wheel drive, all-weather tires, flatbed, towing, all-terrain, whether the vehicle 102 is a truck, SUV, or sedan, and so on. The application logic 264 may thus be configured to identify the capabilities of the vehicle 102A by querying the vehicle data 274 based on the vehicle 102A identifier (e.g., four-wheel drive, truck, SUV), and may determine routes based thereon. For example, if the vehicle 102A is a sedan without all-wheel drive, the geofenced application 250 may only propose routes including unblocked, paved, and dry roads as indicated in the map data 256. Alternatively, if the vehicle 102A is a sedan with four-wheel drive, the application logic 264 may identify routes including dirt roads, an acceptable level of flooding, and/or an acceptable level of debris, as indicated in the map data 256. Rather than including the vehicle 102A identifier, the navigation request may indicate the capabilities of the vehicle 102A directly.

As an example, each hazardous condition included in the map data 256 may include a descriptor and a difficulty level, which may be based on the extent of the hazardous condition. Furthermore, each vehicle 102 identifier may have an endurance level associated therewith, such as in the vehicle data 274, which may be based on the capabilities of the vehicle 102. Responsive to receiving the navigation request, the application logic 264 may be configured to query the vehicle data 274 based on the included identifier to retrieve an endurance level associated with the vehicle 102A. Thereafter, when identifying a route for the vehicle 102A, the application logic 264 may compare the retrieved endurance level with the difficulty level of one or more of the hazardous conditions indicated in the map data 256. If the endurance level is less than a difficulty level associated with a given hazardous travel infrastructure condition, then the application logic 264 may be configured to avoid the hazardous condition when identifying a route. Alternatively, if the endurance level is greater than or equal to the difficulty level, then the application logic 264 may consider a route including the associated hazardous travel infrastructure condition as a route option.

At V, the application logic 264, or more particularly the front end generator 270, may cause the cloud server 106 to communicate a UI update including navigation data to the vehicle 102A. The navigation data may include the one or more routes proposed by the geofenced application 250. Responsive to the vehicle 102 receiving the navigation data, the server application interface 160 may be configured to show the proposed routes on the display 130, such as via the hosted geofenced application UI 262 or the navigation application 161 UI. Responsive to receiving a user selection of one of the proposed routes, the vehicle computing platform 112 may be configured to guide the user based on the selected route, such as via the hosted geofenced application UI 262 or the navigation application 161 UI.

In some embodiments, the geofenced application 250 may primarily rely on the navigation application 161 of the vehicle 102A for guiding a user through and out of the geofenced area 252. In other words, a user may continue utilizing the UI of the factory-installed navigation application 161 to submit destinations and receive route guidance while in the geofenced area 252, which may be enhanced by the geofenced application 250. For instance, the application logic 264, or more particularly the front end generator 270, may be configured to periodically identify hazardous travel infrastructure conditions within the geofenced area 252 based on received geofenced area data 260. Responsive to identifying new hazardous travel infrastructure conditions, the application logic 264 may cause the cloud server 106 to communicate a UI update including navigation data to the vehicle 102A that indicates the hazardous travel infrastructure conditions, possibly in the form of stopped or heavy traffic. Responsive to the vehicle 102A receiving the UI update, the navigation application 161, such as at the direction of the server application interface 160, may be configured to show the hazardous travel infrastructure conditions on a map provided on the display 130 by illustrating stopped traffic of heavy traffic at the location of each hazardous travel infrastructure condition on the map. Moreover, when identifying a route based on a user-input destination, the navigation application 161 may be configured to consider and avoid the hazardous travel infrastructure conditions by being configured to avoid stopped or heavy traffic.

The embodiment illustrated in FIG. 2 is not intended to describe all possible forms of the invention. For example, in the illustrated embodiment, the geofenced application 250 causes the mobile server 108 to communicate updated UI data, such as task data 254, supply data 258, and map data 256, to the vehicle 102A responsive to receiving a request from the vehicle 102A. In alternative embodiments, the geofenced application 250 may be configured to automatically and periodically transmit such UI data to the vehicle 102A, such as based on and/or responsive to the application logic 264 periodically receiving and processing new geofenced area data 260. In this case, responsive to the vehicle computing platform 112 receiving user input requesting illustration of received UI data, such as via the screen 300 (FIG. 3), the vehicle computing platform 112 may cause the hosted geofenced application UI 262 or navigation application 161 to show the UI data, which has already been received and stored in the vehicle computing platform 112, such as in the memory 152 and/or the non-volatile storage 154.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A system comprising:
   a vehicle configured to, responsive to entering a geofenced area including a disaster
      communicate the vehicle is within the geofenced area to a server;

install a user interface received from the server responsive to the communication, the user interface being for a geofenced application associated with the geofenced area and executing on the server; and
communicate a volunteer commit message from the user interface to the geofenced application on the server.

2. The system of claim 1, wherein the vehicle is configured to, responsive to entering the geofenced area
communicate an equipment message to the geofenced application on the server indicating an equipment item available to the vehicle; and
update the user interface to display a plurality of tasks received from the geofenced application on the server responsive to the equipment message, each of the tasks being generated by the geofenced application on the server based on the equipment item,
wherein the volunteer commit message indicates one of the tasks.

3. The system of claim 2, wherein the equipment item comprises a container for transporting a type of supply, and the one task is delivering the supply at a location within the geofenced area.

4. The system of claim 1, wherein the vehicle comprises a plurality of sensors, and is configured to, responsive to entering the geofenced area
communicate environmental data generated by the sensors within the geofenced area to the geofenced application on the server; and
update the user interface to display a plurality of tasks received from the geofenced application on the server responsive to the environmental data communication, the tasks being generated by the geofenced application on the server based on the environmental data,
wherein the volunteer commit message indicates one of the tasks.

5. The system of claim 4, wherein the sensors include a camera, and the environmental data on which generation of the tasks is based includes an image of the geofenced area captured by the camera and a geographical location corresponding to the image.

6. The system of claim 4, wherein the environmental data is periodically communicated to the geofenced application on the server responsive to a user selection of a share option included in the user interface.

7. The system of claim 4, wherein the tasks are further based on environmental data received from a plurality of other vehicles within the geofenced area by the geofenced application on the server.

8. The system of claim 1, wherein the server is in another vehicle within the geofenced area, and the vehicle is configured to communicate with the another vehicle via a vehicle-to-vehicle wireless communications protocol.

9. The system of claim 1, wherein the vehicle is configured to, responsive to exiting the geofenced area, remove the user interface from the vehicle.

10. The system of claim 1, wherein the vehicle is further configured to, responsive to entering the geofenced area, and to receiving travel infrastructure data from the geofenced application on the server indicative of a blocked road, illustrate, on a navigation system of the vehicle, the blocked road as stopped traffic.

11. The system of claim 1, wherein the volunteer commit message indicates a task including a location selected via the user interface, and the vehicle is configured to, responsive to the task being selected, provide route guidance to the location of the task via an embedded navigation system of the vehicle.

12. A system comprising:
a server for a geofenced area including a disaster, the server configured to
responsive to a first vehicle entering the geofenced area, transmit a user interface to the first vehicle;
responsive to receiving sensed environmental data from a second vehicle within the geofenced area that hosts the user interface, generate tasks based on the environmental data; and
transmit the tasks to the first and second vehicles for inclusion on the user interface.

13. The system of claim 12, wherein the server is further configured to, responsive to receiving a volunteer commit message from the first vehicle including one of the tasks selected via the user interface of the first vehicle, transmit a message to the second vehicle that removes the selected task from the user interface.

14. The system of claim 12, wherein the server is included within a third vehicle configured to communicate with the first vehicle and the second vehicle via a vehicle-to-vehicle wireless communications protocol.

15. The system of claim 12, wherein the server is further configured to:
responsive to receiving an equipment message from the first vehicle indicating an equipment item available to the first vehicle, generate second tasks based on the equipment message; and
transmit the second tasks to the first vehicle and not the second vehicle for inclusion in the user interface of the first vehicle.

16. The system of claim 12, wherein the sensed environmental data indicates that a road within the geofenced area includes a hazardous condition caused by the disaster, and the server is further configured to, responsive to receiving the sensed environmental data, transmit navigation data to the first vehicle that causes the first vehicle to illustrate stopped traffic on the road at the hazardous condition on an embedded navigation system of the first vehicle.

17. The system of claim 12, wherein the server is further configured to, responsive to receiving a supply request from the first vehicle via the user interface, transmit supply data to the first vehicle for illustration on the user interface of the first vehicle that indicates a time and a location of an upcoming supply delivery.

18. The system of claim 12, wherein the sensed environmental data indicates a road within the geofenced area includes a hazardous condition caused by the disaster, and the server is further configured to, responsive to receiving an evacuation route request from the first vehicle that includes a vehicle identifier,
identify a capability of the first vehicle based on the vehicle identifier,
identify an evacuation route for the first vehicle that includes the hazardous condition based on the capability, and
transmit the evacuation route to the first vehicle for display by the user interface of the first vehicle.

19. A method comprising:
by a server vehicle for a geofenced area including a disaster
responsive to entering a first area with access to a cloud server, receiving, from the cloud server, a user interface and task data for the geofenced area; and responsive to entering a second area within the geofenced area without access to the cloud server, transmitting the user interface and task data to a volunteer vehicle in the geofenced area.

20. The method of claim 19, further comprising, responsive to receiving geofenced area data indicating a condition of the geofenced area from the volunteer vehicle while at the second area
   traveling to the first area;
   transmitting the geofenced area data to the cloud server; and
   receiving additional task data from the cloud server, the additional task data being generated by the cloud server based on the geofenced area data.

* * * * *